United States Patent
Peng et al.

(10) Patent No.: US 9,775,205 B1
(45) Date of Patent: Sep. 26, 2017

(54) DISCONTINUOUS MODE BUCK CONVERTER AND METHOD THEREFOR

(71) Applicant: NXP B.V., Eindhoven (NL)

(72) Inventors: Chao Peng, Shanghai (CN); Hendrik Boezen, Nijmegen (NL)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 15/442,023

(22) Filed: Feb. 24, 2017

Related U.S. Application Data

(60) Provisional application No. 62/461,017, filed on Feb. 20, 2017.

(51) Int. Cl.
| | |
|---|---|
| *G05F 1/00* | (2006.01) |
| *H05B 37/02* | (2006.01) |
| *H05B 39/04* | (2006.01) |
| *H05B 41/36* | (2006.01) |
| *H05B 33/08* | (2006.01) |
| *H02M 1/08* | (2006.01) |
| *H02M 3/156* | (2006.01) |
| *H02M 1/00* | (2006.01) |

(52) U.S. Cl.
CPC ......... *H05B 33/0818* (2013.01); *H02M 1/08* (2013.01); *H02M 3/156* (2013.01); *H05B 37/0281* (2013.01); *H02M 2001/0054* (2013.01)

(58) Field of Classification Search
None
See application file for complete search history.

(56) References Cited

U.S. PATENT DOCUMENTS

| 7,888,924 | B2 | 2/2011 | Tran et al. |
| 8,179,110 | B2 | 5/2012 | Melanson |
| 9,013,163 | B2 | 4/2015 | Faerber |
| 9,204,512 | B2 * | 12/2015 | Boezen ............ H05B 33/0848 |
| 2007/0182346 | A1 * | 8/2007 | Shteynberg ........ H05B 33/0815 315/308 |
| 2011/0169416 | A1 | 7/2011 | Hsieh |
| 2012/0262082 | A1 * | 10/2012 | Esaki ................. H05B 33/0818 315/224 |

OTHER PUBLICATIONS

On Semiconductor: "High Efficiency Buck Dual LED Driver with Integrated Current Sensing for Automotive Front Lighting"; Publication Order No. NCV78723/D; Semiconductor Components Industries, LLC; Nov. 2015; Rev. 2; 32 pages.
Fu et al., "A DCM-Only Buck Regulator With Hysteretic-Assisted Adaptive Minimum-On-Time Control for Low-Power Microcontrollers," IEEE Transactions on Power Electronics, vol. 31, No. 1, Jan. 2016, 12 pages.
Manohar et al., "Hybrid NEMS-CMOS DC-DC converter for improved area and power efficiency," 2012 25th International Conference on VLSI Design, 6 pages.
Sahu et al., "An Accurate, Low-Voltage, CMOS Switching Power Supply With Adaptive On-Time Pulse-Frequency Modulation (PFM) Control," IEEE Transactions on Circuits and Systems-I: Regular Papers, vol. 54, No. 2, Feb. 2007, 10 pages.

* cited by examiner

*Primary Examiner* — Anh Tran

(57) ABSTRACT

A method includes activating a transistor providing current to a load via an inductor based on values stored at a first timer and at a second timer. The second timer is enabled based a value of a current conducted at the inductor and based on a value of a reference current. The transistor is deactivated in response to determining that a measurement of time elapsed at the first timer is a predetermined multiple of the second measurement of time.

20 Claims, 4 Drawing Sheets

DISCONTINUOUS MODE BUCK CONVERTER AND METHOD THEREFOR

CROSS-REFERENCE TO RELATED APPLICATION(S)

The present application claims priority to U.S. Provisional Patent Application No. 62/461,017, entitled "DISCONTINUOUS MODE BUCK CONVERTER AND METHOD THEREFOR" filed on Feb. 20, 2017, the entirety of which is herein incorporated by reference.

FIELD OF THE DISCLOSURE

This disclosure relates generally to power supplies, and more particularly to a discontinuous mode buck converter.

BACKGROUND

A buck converter is a DC-to-DC power converter and is a class of switched-mode power supply. A buck converter can be used to step-down a supply voltage to a level suitable to power a device. Switching converters, such as buck converters, provide greater power efficiency than linear regulators. Buck converters can operate in a continuous conduction mode (CCM) or a discontinuous conduction mode (DCM). Buck converters operating in a continuous conduction mode typically operate at a higher switching frequency than converters operating in a discontinuous mode. The higher operating frequency of a CCM buck converter contributes to higher switching losses compared to DCM buck converters. A disadvantage of DCM buck converters is that a current provided by the converter is typically dependent on the magnitude of the supply voltage received at the converter.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

FIGS. 1-4 illustrate techniques for implementing a buck converter that operates in a discontinuous conduction mode (DCM), yet provides an output current that is not dependent on a magnitude of a supply voltage. By operating in a discontinuous conduction mode, switching losses are reduced relative to a buck converter operating in a continuous conduction mode (CCM). The buck converter disclosed herein is works well for supplying a low average current to a load without the need for a high switching frequency, while minimizing the size of an included inductor. The disclosed buck converter utilizes a timer circuit that measures a time that a current at the inductor is above a desired reference value. A multiple of the measured time value is used to set the switching frequency of the converter. While these techniques are illustrated in the context of a light-emitting diode driver, one of skill in the related arts will appreciate that the disclosed buck converter is suitable for providing power to another type of load when the objective is to provide an average current to the load that is independent of input and output voltages.

Figure 1:
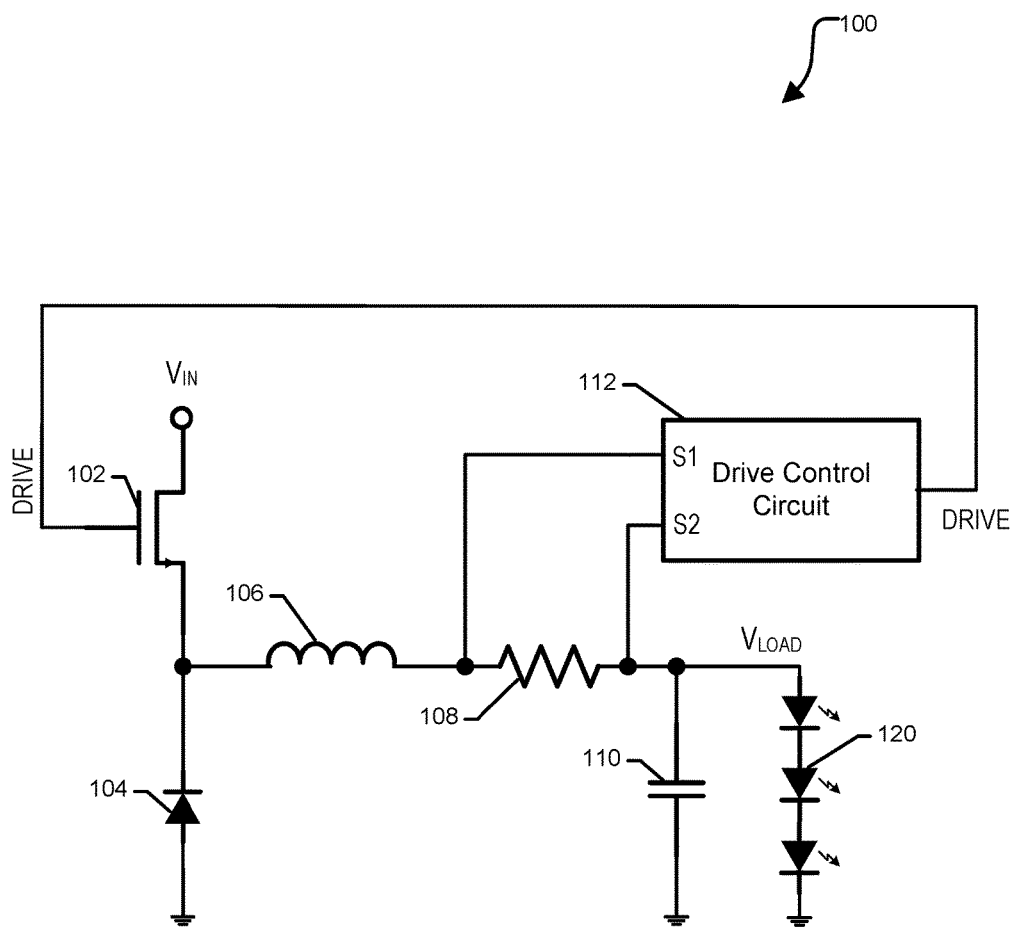
FIG. 1 is a schematic diagram illustrating a buck converter that operates in a discontinuous mode according to a specific embodiment of the present application.

FIG. 1 is a schematic diagram illustrating a buck converter 100 that operates in a discontinuous conduction mode according to a specific embodiment of the present application. Buck converter 100 is configured to receive a supply voltage, $V_{IN}$, at an voltage supply input terminal, and to generate an output voltage, $V_{LOAD}$, at a voltage supply output terminal. Buck converter 100 includes a drive transistor 102, a diode 104, an inductor 106, a sense resistor 108, a capacitor 110, and a drive control circuit 112. Buck converter 100 is illustrated providing power to a load comprising light-emitting diodes (LED) 120. During operation, drive control circuit 112 is configured to assert and de-assert signal DRIVE to activate and deactivate drive transistor 102. When drive transistor 102 is activated, supply voltage $V_{IN}$ is provided to parallel-connected capacitor 110 and LED 120 via inductor 106 and sense resistor 108. A voltage across sense resistor 108 is proportional to a current in inductor 106, and this sense voltage is used by drive control circuit 112 to control the switching of signal DRIVE.

As with traditional buck converters, drive transistor 102 acts as a switch that is either open (off/deactivated-state) or closed (on/active-state). When drive transistor 102 is activated, current in inductor 106 begins to increase, and inductor 106 produces an opposing voltage across its terminals in response to the changing current. This voltage drop has a polarity that is opposite that of supply voltage $V_{IN}$ and therefore reduces the net voltage across the load (LED 120). Over time, the rate of change of current decreases, and the voltage across inductor 106 also then decreases, increasing the voltage across the load. During this time, the inductor stores energy in the form of a magnetic field.

When drive transistor 102 is deactivated, supply voltage $V_{IN}$ is removed from the circuit and the current in inductor 106 decreases. The changing current will produce a change in voltage across inductor 106, and inductor 106 becomes a voltage source. The stored energy in the inductor's magnetic field supports current flow through LED 120. During this time, inductor 106 is discharging its stored energy into the rest of the circuit. If drive transistor 102 is deactivated again while the current is still changing across inductor 106, there will always be a voltage drop across inductor 106, so the net voltage ($V_{LOAD}$) at the load, assuming there is no voltage drop across sense resistor 108, will always be less than the input voltage source $V_{IN}$. If drive transistor 102 is activated again before inductor 106 is fully discharged, there will always be a voltage across inductor 106, so the net voltage at the load will always be greater than zero. When operating in discontinuous mode, current through inductor 106 falls to zero before drive transistor 102 is reactivated.

Buck converter 100, and drive control circuit 112 in particular, controls the activation and deactivation of drive transistor 102 in a manner so as to provide an average current to LED 120 that is proportional to a reference current, and independent of the value of supply voltage $V_{IN}$. This average current is achieved by measuring a time that current in inductor 106 is greater than the value of the reference current and comparing this value to a how long drive transistor 102 has been activated. Operation of drive control circuit 112 can be better understood with reference to FIG. 2.

Figure 2:
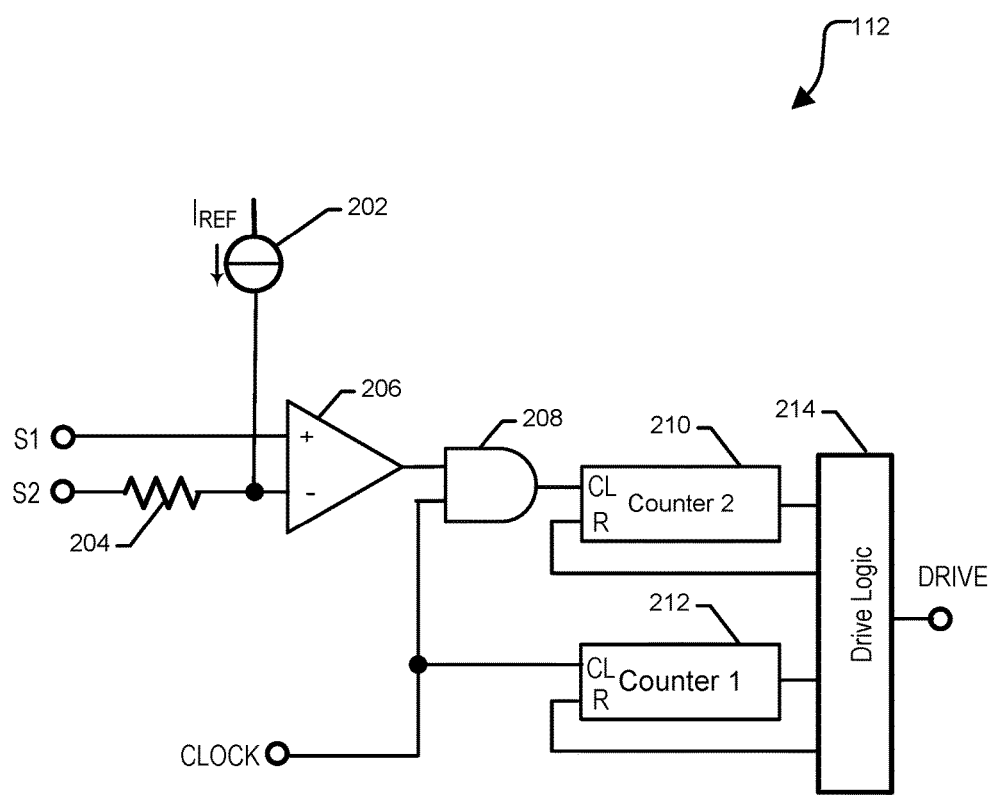
FIG. 2 is a schematic diagram illustrating a drive control circuit of the buck converter of FIG. 1 according to a specific embodiment of the present application.

FIG. 2 is a schematic diagram illustrating a drive control circuit 112 of the buck converter 100 of FIG. 1 according to a specific embodiment of the present application. Drive control circuit 112 includes a reference current source 202, a resistor 204, a comparator 206, an AND gate 208, a counter 210 labeled Counter 2, a counter 212 labeled Counter 1, and drive logic 214. Drive control circuit 112 includes input terminals S1 and S2 corresponding to the terminals of sense resistor 108 of FIG. 1, an input terminal for receiving a clock signal, labeled CLOCK, and an output terminal, labeled DRIVE, for providing a signal that controls drive transistor 102 of FIG. 1. Counter 212 is configured to increment in response to each cycle of signal Clock received at input CL, and can be reset based on a signal received at input R from drive logic 214. Counter 210 is also configured to increment in response to cycling of signal CLOCK received at input CL, however signal CLOCK is gated by AND gate 208 based on the output of comparator 206. Counter 210 can be reset based on a signal received at input R from drive logic 214.

Counters 210 and 212 perform the function of timers by accumulating a record of successive periods of signal CLOCK. One of skill will appreciate that other timer implementations can be utilized, including digital timers and analog timers. For example, a resistor-capacitor (RC) circuit having a corresponding time constant can be used to measure time, the elapse of time corresponding to a level of voltage realized at the capacitor of the RC circuit. Accordingly, drive logic 214 can include one or more voltage comparators configured to determine a relationship between voltage levels at two RC circuits.

During operation, comparator 206 receives a voltage across sense resistor 108 of FIG. 1, the voltage being proportional to a current in inductor 106. The voltage across sense resistor 108 is compared to a reference voltage provided by reference current source 202 and resistor 204. A typical value of resistor 204 can be 5000 Ohm, a typical value of reference current 202 can be 20 uA, and a typical value of resistor 108 can be 200 mOhm. When the voltage across sense resistor 108 is greater than the reference voltage, the output of comparator 206 is at a logic-high state, enabling AND gate 208 to couple signal CLOCK to counter 210. When the voltage across sense resistor 108 is less than the reference voltage, the output of comparator 206 is at a logic-low state, disabling AND gate 208, and therefore preventing the increment of counter 210 based on the cycling of signal CLOCK. Drive logic 214 controls the assertion of signal DRIVE and resetting of counters 210 and 212 based on count values maintained at counters 210 and 212. Operation of drive control circuit 112, and drive logic 214 in particular, can be better understood with reference to timing diagram 300 of FIG. 3.

Figure 3:
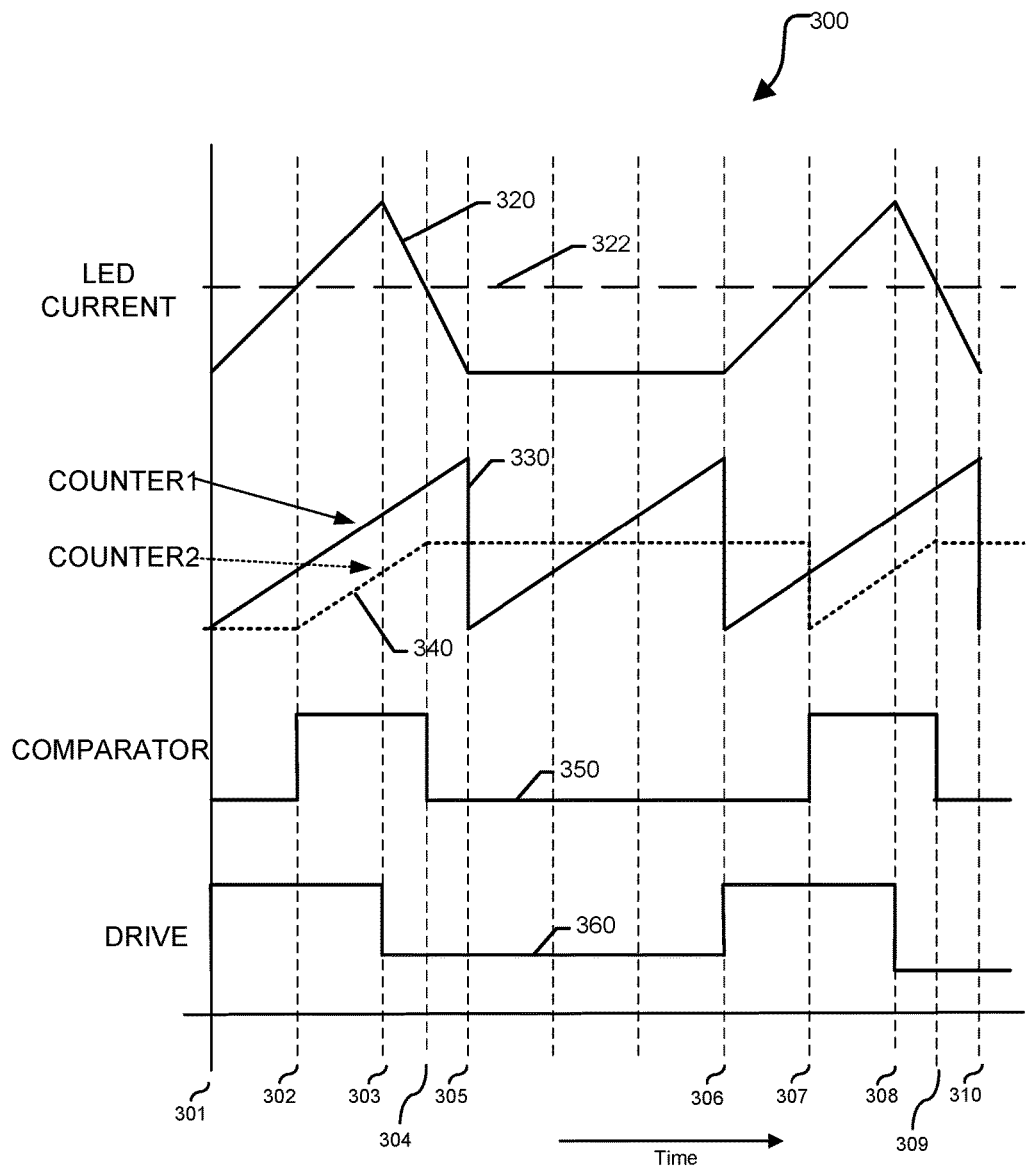
FIG. 3 is a timing diagram illustrating operation of the buck converter of FIG. 1 according to a specific embodiment of the present application.

FIG. 3 is a timing diagram 300 illustrating operation of the buck converter 100 of FIG. 1 according to a specific embodiment of the present application. Timing diagram 300 includes a horizontal axis representing time and a vertical axis representing the current or voltage of waveforms 320, 322, 330, 340, 350, and 360. Time references 301-310 are specifically shown. Waveform 320, labeled LED CURRENT, represents a current provided to LED 220 via output $V_{LOAD}$. Waveform 322 represents an average, and desired, value of the current provided to LED 220. Waveform 330, labeled COUNTER 1, represents a count value maintained at counter 212, and waveform 340, labeled COUNTER 2, represents a count value maintained at counter 210. Waveform 350, labeled COMPARATOR, represents a signal, e.g. a voltage signal, at the output of comparator 206 of FIG. 2, and waveform 360 represents signal DRIVE provided by drive logic 214 of drive control circuit 112.

At time 301, drive logic 214 asserts signal DRIVE, activating drive transistor 102 of FIG. 1 and causing a current to begin to flow at LED 120, as depicted by waveform 320. Also at time 301, counter 212 begins to increment in response to each cycle of signal CLOCK. At time 302, current at inductor 106 has increased to a value equal to that of reference current source 202, causing the output of comparator 206 to switch from a logic-low state to a logic-high state, and thereby enabling propagation of signal CLOCK to counter 210 via AND gate 208 so that counter 210 begins to increment in response to each cycle of signal CLOCK, as depicted by waveform 340. At time 303, drive logic 214 determines that a count registered at counter 212 has reached a value that is proportional to a count registered at counter 210. By way of example, it is presumed that counter 212 has reached a value that is twice that of counter 210. Accordingly, for half of the time that drive transistor 102 was activated, current in inductor 106 was above the target value, $I_{REF}$. Therefore, the peak current at inductor 106 is twice the target value. At time 303, drive logic 214 de-asserts signal DRIVE, deactivating drive transistor 102, and causing the current in inductor 106 to begin to fall.

At time 304, current at inductor 106 has decreased to a value that is once again equal to the value of reference current source 202, causing the output of comparator 206 to return to a logic-low state, pausing incrementing of counter 210. While paused, counter 210 maintains a count value attained at the time that incrementing was paused. Counter 212 continues to increment. At time 305, drive logic 214 determines that the count registered at counter 212 has once again reached a value that is twice the count registered at counter 210. Accordingly, it can be concluded that a value of the current in inductor 106 has returned to zero. Therefore, the average current over the period from time 301 and time 305 is equal to that of reference current source 202. Counter 212 is now reset and once again begins to increment in response to each cycle of signal CLOCK.

At time 306, drive logic 214 reasserts signal DRIVE and resets counter 212 in response to determining that the count at counter 212 is again equal to twice the count registered at counter 210. Time 306 is correspondingly similar to time 301. Because the period of time between time 305 and 306 is equal to the time between time 301 and time 305, an average current provided to LED 120 is one half that of reference current source 202. At time 307, current in inductor 106 has again increased to that of reference current source 202, causing the output of comparator 206 to return to a logic-high state. This event causes drive logic 214 to reset counter 210, and causes AND gate 208 to propagate signal CLOCK to counter 210, causing counter 210 to begin incrementing similar to time 302. Operation continues as described above, with time 308 corresponding to time 303, time 309 corresponding to time 304, and time 310 corresponding to time 305.

In an embodiment, signal DRIVE can be reasserted at time 305, thus causing the current in inductor 106 to start increasing immediately after reaching zero. In this embodiment, an average current provided to LED 120 is equal to that of reference current source 202. In another embodiment, drive logic 214 can maintain drive transistor 102 in an inactive state for one or more intervals corresponding to the period of time between time 305 and time 306. For example, if drive logic 214 configures counter 212 to be incremented and reset twice before reasserting signal DRIVE, then and average current provided to LED 120 will be one-third that of reference current source 202.

Figure 4:
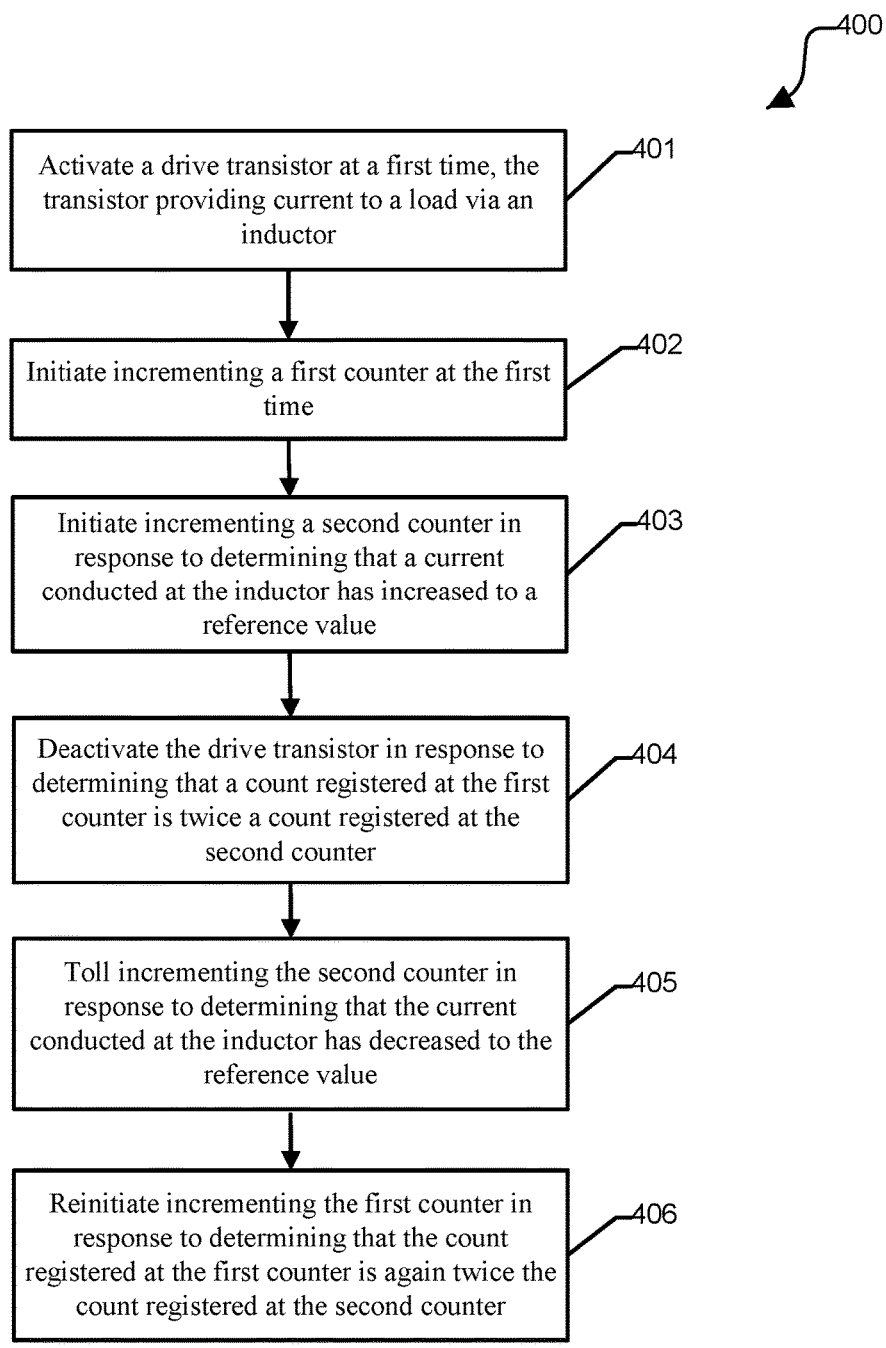
FIG. 4 is a flow diagram illustrating operation of the buck converter of FIG. 1 according to a specific embodiment of the present application.

FIG. 4 is a flow diagram illustrating a method 400 showing operation of the buck converter 100 of FIG. 1 according to a specific embodiment of the present application. Method 400 begins at block 401 where a drive transistor is activated at a first time, the transistor providing current to a load via an inductor. For example, drive logic 214 can assert signal DRIVE causing drive transistor 102 to be activated. The method continues at block 402 where incrementing a first counter is initiated at the first time. For example, drive logic 214 can reset counter 212, at which point counter 212 begins incrementing in response to cycles of signal CLOCK. Blocks 201 and 202 of method 400 can correspond to time 301 at timing diagram 300 of FIG. 3.

At block 403, incrementing of a second counter is initiated in response to determining that a current conducted at the inductor has increased to a reference value. For example, at time 302, the output of comparator 206 can switch to an logic-high state indicating that current in inductor 106 has increased to a value that is equal to that of reference current source 202. As a result, signal CLOCK is propagated via AND gate 208 to the input of counter 210, which begins incrementing. At block 404, the drive transistor is deactivated in response to determining that a count registered at the first counter is twice a count registered at the second counter. For example, at time 303, drive logic 214 determines that a count registered in counter 212 is twice a count registered in counter 210, causing drive logic 214 to deactivate drive transistor 102. At this point, current in inductor 106 begins to decrease.

At block 405, incrementing of the second counter is paused in response to determining that the current conducted at the inductor has decreased to the reference value. For example, at time 304, the output of comparator 206 returns to a logic-low state, causing AND gate 208 to interrupt delivery of signal CLOCK to counter 210. Counter 210 maintains the present count value. At block 406, incrementing of the first counter is reinitiated in response to determining that the count registered at the first counter is again a predetermined multiple, e.g. twice, of the count registered at the second counter. For example, at time 305, drive logic 214 determines that a count registered in counter 212 is once again twice a count registered in counter 210, causing drive logic 214 to reset counter 212, reinitializing the count registered therein to zero. Counter 212 proceeds to increment in response to each cycle of signal CLOCK. At time 305, the average current provided to LED 120 is equal to that of reference current source 202. As described above, drive logic 214 can immediately reactivate drive transistor 102 at time 305, or can insert one or more periods in which drive transistor 102 remains deactivated. Each of the additional periods corresponds to the time for a count registered at counter 212 to return to the value at time 305. For example, at time 306, drive transistor 102 is reactivated, and method 400 begins again.

In a first aspect, a method includes activating a drive transistor at a first time, the transistor providing current to a load via an inductor. A first measurement of time is initiated, beginning at the first time. A second measurement of time is initiated in response to determining that a current conducted at the inductor is greater than a reference value. The drive transistor is deactivated in response to determining that the measurement of time elapsed at the first timer is a predetermined multiple of the second measurement of time. The second measurement of time is paused in response to determining that the current conducted at the inductor is less than the reference value. In response to the first measurement of time again being the predefined multiple of the second measurement, the first measurement of time is reinitiated. In an embodiment of the first aspect, an average current provided to the load between the first time and the reinitiating is a predefined multiple of to the reference value. In an embodiment of the first aspect, the drive transistor is reactivated in response to the reinitiating. In an embodiment of the first aspect, a total elapsed time from the first time to the time of reinitiating is determined, and the drive transistor is reactivated at a time equal to an integer multiple of the total elapsed time after the first time.

In an embodiment of the first aspect, an average current provided to the load between the first time and the reactivating is a predefined multiple of the reference value. In an embodiment of the first aspect, power is provided to the load according to a discontinuous conduction mode. In an embodiment of the first aspect, an average current provided to the load remains constant in response to an increase in value of a supply voltage received at the drive transistor. In an embodiment of the first aspect the first measurement of time is provided by a counter configured to receive a clock signal. In an embodiment of the first aspect, the load is a light-emitting diode.

In a second aspect, a driver includes an inductor and a drive transistor including a current electrode coupled to a load via the inductor. The driver also includes a first timer to initiate measurement of time at a first time, a comparator to assert an enable signal in response to determining that a current conducted at the inductor is greater than a predefined multiple of a reference value, and a second timer to initiate measurement of time in response to assertion of the enable signal, and to pause the measurement of time in response to de-assertion of the enable signal. The driver also includes drive logic to activate the drive transistor at the first time, deactivate the drive transistor in response to determining that the measurement of time elapsed at the first timer is a predetermined multiple of the measurement of time elapsed at the second timer, and reinitiate measurement of time at the first timer in response to determining that the measurement of time elapsed at the first timer is again the predetermined multiple of time elapsed at the second timer. In an embodiment of the second aspect, an average current provided to the load between the first time and the reinitiating is a predefined multiple of to the reference value. In an embodiment of the second aspect, the drive logic is further to reactivate the drive transistor in response to the reinitiating.

In an embodiment of the second aspect, the drive logic also determines a total elapsed time from the first time to the time of reinitiating, and reactivates the drive transistor at a time equal to an integer multiple of the total elapsed time after the first time. In an embodiment of the second aspect, an average current provided to the load between the first time and the reactivating is a predefined multiple of the reference value. In an embodiment of the second aspect, the driver is configured to operate in a discontinuous conduction mode. In an embodiment of the second aspect, an average current provided to the load remains constant in response to an increase in value of a supply voltage received at the drive transistor. In an embodiment of the second aspect, the first timer comprises a counter configured to receive a clock signal. In an embodiment of the second aspect, the load is a light-emitting diode.

In a third aspect, a light-emitting diode (LED) driver circuit includes a first input to receive a clock signal, a second input to receive a supply voltage, and an output to provide power to a load. The driver circuit also includes a transistor including a current electrode coupled to the load via an inductor, a comparator to assert an enable signal in response to determining that a current conducted at the inductor is greater than a predefined multiple of a reference value, a first counter to increment a count of individual cycles of the clock signal, the incrementing initiated at a first time, and a second counter to increment a count of individual cycles of the clock signal in response to assertion of the enable signal. The driver circuit further includes drive logic to activate the drive transistor at a first time, deactivate the drive transistor in response to determining that a count registered at the first counter is twice a count registered at the second counter, and reinitiate incrementing the first counter in response to determining that the count registered at the first counter is again twice the count registered at the second counter. In an embodiment of the third aspect, the drive logic is further to reactivate the drive transistor in response to the reinitiating.

The preceding description in combination with the Figures was provided to assist in understanding the teachings disclosed herein. The discussion focused on specific implementations and embodiments of the teachings. This focus was provided to assist in describing the teachings, and should not be interpreted as a limitation on the scope or applicability of the teachings. However, other teachings can certainly be used in this application. The teachings can also be used in other applications, and with several different types of architectures.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   activating a drive transistor at a first time, the transistor providing current to a load via an inductor;
   initiating a first measurement of time beginning at the first time;
   initiating a second measurement of time in response to determining that a current conducted at the inductor is greater than a reference value;
   deactivating the drive transistor in response to determining that the measurement of time elapsed at the first timer is a predetermined multiple of the second measurement of time;
   pausing the second measurement of time in response to determining that the current conducted at the inductor is less than the reference value; and
   in response to the first measurement of time again being the predefined multiple of the second measurement, reinitiating of the first measurement of time.

2. The method of claim 1 wherein an average current provided to the load between the first time and the reinitiating is a predefined multiple of to the reference value.

3. The method of claim 1, further comprising reactivating the drive transistor in response to the reinitiating.

4. The method of claim 1, further comprising:
   determining a total elapsed time from the first time to the time of reinitiating; and
   reactivating the drive transistor at a time equal to an integer multiple of the total elapsed time after the first time.

5. The method of claim 4, wherein an average current provided to the load between the first time and the reactivating is a predefined multiple of the reference value.

6. The method of claim 1, wherein power is provided to the load according to a discontinuous conduction mode.

7. The method of claim 1, wherein an average current provided to the load remains constant in response to an increase in value of a supply voltage received at the drive transistor.

8. The method of claim 1, wherein the first measurement of time is provided by a counter configured to receive a clock signal.

9. The method of claim 1 wherein the load is a light-emitting diode.

10. A driver comprising:
    an inductor;
    a drive transistor including a current electrode coupled to a load via the inductor;
    a first timer to initiate measurement of time at a first time;
    a comparator to assert an enable signal in response to determining that a current conducted at the inductor is greater than a predefined multiple of a reference value;
    a second timer to initiate measurement of time in response to assertion of the enable signal, and to pause the measurement of time in response to de-assertion of the enable signal;
    drive logic to:

activate the drive transistor at the first time;

deactivate the drive transistor in response to determining that the measurement of time elapsed at the first timer is a predetermined multiple of the measurement of time elapsed at the second timer; and reinitiate measurement of time at the first timer in response to determining that the measurement of time elapsed at the first timer is again the predetermined multiple of time elapsed at the second timer.

11. The driver of claim 10 wherein an average current provided to the load between the first time and the reinitiating is a predefined multiple of to the reference value.

12. The driver of claim 10, wherein the drive logic is further to reactivate the drive transistor in response to the reinitiating.

13. The driver of claim 10, wherein the drive logic is further to:

determine a total elapsed time from the first time to the time of reinitiating; and reactivate the drive transistor at a time equal to an integer multiple of the total elapsed time after the first time.

14. The driver of claim 13, wherein an average current provided to the load between the first time and the reactivating is a predefined multiple of the reference value.

15. The driver of claim 10, wherein the driver is configured to operate in a discontinuous conduction mode.

16. The driver of claim 10, wherein an average current provided to the load remains constant in response to an increase in value of a supply voltage received at the drive transistor.

17. The driver of claim 10, wherein the first timer comprises a counter configured to receive a clock signal.

18. The driver of claim 10 wherein the load is a light-emitting diode.

19. A light-emitting diode (LED) driver circuit comprising:

a first input to receive a clock signal;

a second input to receive a supply voltage;

an output to provide power to a load;

a transistor including a current electrode coupled to the load via an inductor;

a comparator to assert an enable signal in response to determining that a current conducted at the inductor is greater than a predefined multiple of a reference value;

a first counter to increment a count of individual cycles of the clock signal, the incrementing initiated at a first time;

a second counter to increment a count of individual cycles of the clock signal in response to assertion of the enable signal; and drive logic to:

activate the drive transistor at a first time;

deactivate the drive transistor in response to determining that a count registered at the first counter is twice a count registered at the second counter; and reinitiate incrementing the first counter in response to determining that the count registered at the first counter is again twice the count registered at the second counter.

20. The driver circuit of claim 19, wherein the drive logic is further to reactivate the drive transistor in response to the reinitiating.

* * * * *